3,054,843
BATTERY SEPARATOR

William J. Yurgen, Bailey Bennett, and Stephen Palinchak, Columbus, Ohio, assignors, by mesne assignments, to General Motors Corporation, Detroit, Mich., a corporation of Delaware
No Drawing. Filed Apr. 27, 1960, Ser. No. 24,877
14 Claims. (Cl. 136—146)

This invention relates to battery separators, and more particularly to battery separators of butyl rubber.

The ordinary storage battery is constructed with a plurality of electrolytic cells formed of a series of connected positive plates and an intermeshed series of connected negative plates. These plates are usually immersed in an electrolyte such as sulfuric acid. The useful life of such an electrolytic cell ends when conductive contact is established between the positive and negative plates. The contact may result from a large number of causes incident to the normal reaction which takes place during charging and discharging of the cell or battery. Frequently one or more of the plates become buckled to the extent that actual plate-to-plate contact is established. Very often the plates become bridged at one or more spaced apart points by metallic deposits or deposits of active material which build up on the plate walls, or by inadvertent depositions to cause the process known as treeting. The common device utilized to prevent such shorting out is the battery separator between the plates. This barrier prevents such contact.

The ideal battery separator has certain qualifications to enable it to be used extensively under adverse conditions; that is, the separator must be acid resistant; should be porous enough to allow free electrolytic action, and yet not so porous as to allow movement of battery mud from plate to plate; should not contaminate the electrolyte; must not create local reactions between the plates to accelerate any decomposition in one spot; and should have high oxidation resistance.

An object of this invention, therefor, is to provide a battery separator which has all of these characteristics. A further object is to provide a separator which can be installed very readily because of its flexibility, but which is stiff enough to function properly as a separator. Further objects are to provide a butyl separator which has improved properties when compared to the present paper, wood, fiberglass, glass, natural rubber and other separators, but which compares very favorably with these materials, economically.

It is a further object to provide a separator of a particular composition of butyl rubber which allows easy processing, curing, and handling while still retaining its desirable separator characteristics.

The present invention is based upon the unexpected discovery that certain proportions of butyl with certain proportions of particular accelerators, curing agents, and a particular softener along with designated fillers, result in a butyl-type separator which has extraordinary properties as a battery separator, and which may be readily processed, cured and formed to provide a separator which may be easily installed. This unexpected discovery is based upon the use of quinoid type materials along with red lead [$Pb_3O_4$], 2-mercaptobenzothiazole

[S·$C_6H_4$·N:C·SH]

benzothiazyl disulfide [$(S·C_6H_4·N:C)_2S_2$], sulfur and dioctyl phthalate in certain proportions in the butyl separator.

It is recognized that quinoids have been utilized as curing agents for natural rubber and for butyl rubber heretofore, and it is recognized that various proportions of the above compounds have been known in the prior art for vulcanizing rubber, and applicants do not pretend to be the inventors of these. Applicants have, however, invented a particular battery separator and a method of making this battery separator by utilizing particular proportions of the above materials along with certain other materials to be described. The butyl separator developed has very advantageous properties both as an operating separator and as a separator material of easy handling and processing. The cured butyl product showed low shrinkage, high oxidation resistance, high flexibility, low sulfur requirements, ability to absorb large amounts of filler and silica gel, short cure time, relatively low stable price, low electrical resistivity, ability to be calendered thin (15 to 20 mils), potential for continuous processing, high acid resistance, good impact characteristics, and easy assembly characteristics without danger of breakage.

Applicants have discovered three similar but particular compositions which have these characteristics:

[Parts by weight]

| | Butyl No. 1 | Butyl No. 2 | Butyl No. 3 |
|---|---|---|---|
| Butyl 325 | 100 | 100 | 100 |
| Zinc oxide | 5 | 5 | 5 |
| Paraffin wax | 2 | 2 | 2 |
| Celite 322 | 50 | 50 | 50 |
| Hi Sil 233 | 15 | 15 | 15 |
| p-Quinone dioxime | 2 | 2 | |
| Chloranil (tetrachloro-p-benzoquinone) | | | 2 |
| $Pb_3O_4$ (red lead) | 4 | | |
| Benzothiazyl disulfide | | 4 | 4 |
| 2,-mercaptobenzothiazole | 1 | | |
| Sulfur | 2 | 2 | 2 |
| Dioctyl phthalate | 10 | 10 | 10 |
| Silica gel | 400 | 400 | 400 |

The three compositions given above were all found to be very effective as battery separators when cured. Each of the three, however, has somewhat different properties and thus may be desirable under different circumstances, depending on the properties desired of any particular battery. The separators do have certain very desirable characteristics in common, however, and in order to illustrate this, these characteristics are contrasted in the following chart to the natural rubber battery separators which are presently in use. It is recognized that certain properties of butyl rubber are known to be superior to natural rubber. However, the present invention enables certain of these properties in addition to other properties desirable in battery separators to be taken advantage of by utilizing the particular compositions set forth above.

| | Control separator (natural rubber presently used) | Butyl separator |
|---|---|---|
| Physical and electrical properties: | | |
| Izod impact | Breaks | Bends but does not break. |
| Bend | 70–100°, breaks | Bends 180° without breaking. |
| Chip test | Breaks | Bends but does not chip. |
| Web thickness | 0.025 in | 0.025 in. |
| Shrinkage, 220° for 16 hours | 2.37 | 0.75 percent. |
| Oxidation, weight-loss | 12.03 | 11.6 percent. |
| Resistivity, ohm/sq. in. | 0.0245 / 0.0196 | 0.0372 (1-hr. soak). / 0.0279 (24-hr. soak). |
| Acid resistance | | No attack 7 days in 1.300 sp. gr. $H_2SO_4$ at 150° F. |
| Processing characteristics: | | |
| Milling | Good | Good. |
| Calendering | do | Do. |
| Calender temperature | 140° F | 100–105° F. |
| Calender speed | | 14 ft./min. and 40 ft./min. |
| Cure | 3 hrs. at 325° F | 3 hrs. at 325° F. |

Although the inventors do not completely understand how the various accelerators operate synergistically to form the very useful battery separator material, it is known to be necessary that the p-quinone dioxime, the 2-mercaptobenzothiazole and red lead, or the benzothiazyl disulfide be in approximately the amounts stated above to effectively accelerate the curing of the butyl compound to form the desired product. The softener dioctyl phthalate is also necessary and important to get the improved processing qualities of the material. The butyl 325 which was utilized contained a high percent mole unsaturation, namely, 2.0 to 2.5%, due to the presence of a small amount of a diolefin, preferably isoprene, and is obtainable from the Enjay Company, Incorporated. The Celite 322 is a diatomaceous earth material and may include the usual skeletonized diatomites of siliceous earth, infusorial earth, kieselguhr, diatomite, tripolite and the like, all of which are obtainable under the trade names Celite and Dicalite. The Hi-Sil component is a reinforcing pigment of a slightly hydrated silica of extremely fine particle size made by a wet process. The silica gel is intermixed to cause the formation of a porous separator material upon departure of the high percentage water component. The method is which this silica gel forms the porous material for battery separators is clearly taught in U.S. Patent 2,329,322 to Baty et al.

To obtain the finished battery separator, the original materials are compounded and extruded or calendered to form a continuous strip from which the separators are later cut. After extrusion, the stock is wrapped in rolls for curing in steam or hot water, and later cut into individual separators. It was found that the applicants' particular compositions gave the best results insofar as processing characteristics are concerned when the calendering temperature was approximately 85 to 110 F. The actual curing temperatures may vary somewhat but the optimum temperature was found by the inventors to be 325° F. when curing for one hour. The method of shaping the battery separators may be similar to the one disclosed in Hazell et al. 2,121,872 and is well known to those having ordinary skill in the art. After these forming processes are carried out, the finished product constitutes an all-butyl battery separator having very desirable qualities. The use of external supporting materials such as fiberglass or the like is not necessary. It is possible for anyone desiring to form a stiffer separator to add to the composition such materials as natural rubber, reclaimed rubber, polybutadiene, and SBR type rubbers. The amount added would vary with the application, of course, but the applicants have found that from 0 to 25 parts of added material per 100 parts by weight of the butyl works very well. Obviously an appropriate amount of sulfur (about 10 to 25 parts) should be added when adding sulfur-vulcanizable materials, to produce the hardened rubber composition in situ. Silicas and diatomaceous earth or wood flour may also be used in varying amounts as stiffener materials. A higher percentage of silicas and silicates, although increasing the stiffness, does so at the expense of porosity and cost, however, and this should be born in mind when so doing. Reinforcing materials such as hard clays and cellulosic fibers did not appear effective in stiffening the butyl separators.

Applicants' butyl separator material was found to be very favorably affected by the addition of a nominal amount of Vinsol resin. The optimum amount was found to be about 25 to 50 parts of Vinsol per 100 parts by weight of butyl, although the limits of this range are flexible. This resin improved the processing properties considerably and reduced shrinkage of the calendered stock. The Vinsol resin is a substantially gasoline-insoluble resinous material which may be prepared from pine wood by the processes set forth in U.S. patents to Hall 2,193,026 and 2,221,540. Other methods of isolating this pine wood resin may be employed if desired. The resin is actually a complex mixture of many components. It is generally characterized by partial solubility in aromatic hydrocarbons, a methoxy content of from 3 to 7.5%, an acid number of from 90 to 110, a saponification number of 135 to 160 and a melting point of 95° C. to 125° C.

Although applicants' butyl material may be altered in its composition to a limited extent by those having ordinary skill in the art, these modifications are considered by the applicants to be part of their invention if within the spirit of the invention. This invention is intended to be limited only by the scope of the appended claims and the equivalents thereto.

We claim:

1. A separator for storage batteries comprising a cured butyl rubber, the uncured composition of said rubber comprising, by weight, 100 parts butyl rubber, 5 parts zinc oxide, 2 parts paraffin wax, 50 parts Celite, 15 parts Hi-Sil, 2 parts p-quinonedioxime, 4 parts red lead, 1 part 2-mercaptobenzothiazole, 2 parts sulfur, 10 parts dioctyl phthalate, and silica gel.

2. A butyl separator for storage batteries comprising the polymerized product of about 100 parts by weight butyl rubber, 5 parts zinc oxide, 2 parts paraffin wax, 50 parts Celite, 15 parts Hi-Sil, 2 parts p-quinone dioxime, 4 parts benzothiazyl disulfide, 2 parts sulfur, 10 parts dioctyl phthalate, and silica gel.

3. A butyl rubber separator for storage batteries comprising the polymerized product of about 100 parts by weight butyl rubber, 5 parts zinc oxide, 2 parts paraffin wax, 50 parts Celite, 15 parts Hi-Sil, 2 parts chloranil, 4 parts benzothiazyl disulfide, 2 parts sulfur, 10 parts dioctyl phthalate, and a substantial amount of silica gel.

4. A butyl rubber separator for storage batteries consisting of the polymerized product of about 100 parts by weight butyl rubber, 5 parts zinc oxide, 2 parts paraffin wax, 50 parts diatomaceous earth, 15 parts slightly hydrated silica, 2 parts sulfur, 10 parts dioctyl phthalate, a substantial amount of silica gel, and one of the groups consisting of (A) 2 parts p-quinone dioxime, 4 parts red lead, and 1 part 2-mercaptobenzothiazole, (B) 2 parts p-quinone dioxime and 4 parts benzothiazyl disulfide and (C) 2 parts chloranil and 4 parts 2,2'-dithiobisbenzothiazole.

5. A separator for storage batteries composed of a cured porous butyl rubber material, said material in the uncured state containing one hundred parts of butyl rubber and one of the groups of materials consisting of (A) two parts p-quinone dioxime, four parts red lead, one part 2-mercaptobenzothiazole and sulfur, (B) two parts p-quinone dioxime, benzothiazyl four parts disulfide, and sulfur, and (C) two parts chloranil, four parts 2,2'-dithiobisbenzothiazole, and sulfur; and also containing 10 parts of dioctyl phthalate and a substantial amount of silica gel.

6. The separator in claim 1 wherein the uncured composition contains 25 to 50 parts Vinsol resin.

7. The separator in claim 2 wherein the unpolymerized composition contains 25 to 50 parts Vinsol resin.

8. The separator in claim 3 wherein the unpolymerized composition contains 25 to 50 parts Vinsol resin.

9. The separator in claim 4 having 25 to 50 parts Vinsol resin and from 0 to 25 parts of a material of the group consisting of (A) natural rubber, (B) reclaimed rubber, (C) polybutadiene, (D) SBR rubber, and mixtures thereof.

10. The method of making a porous butyl rubber battery separator comprising the steps of compounding about 100 parts by weight butyl rubber, 5 parts zinc oxide, 2 parts paraffin wax, 50 parts diatomaceous earth, 15 parts slightly hydrated silica, 2 parts sulfur, 10 parts dioctyl phthalate, a substantial amount of silica gel and one of the groups consisting of (A) 2 parts p-quinone dioxime, 4 parts red lead, and 1 part 2-mercaptobenzothiazole, (B) 2 parts p-quinone dioxime and 4 parts benzothiazyl disulfide, and (C) 2 parts chloranil and 4 parts benzothiazyl disulfide, extruding said compounded stock into strips, curing the extruded strips, and cutting the strips into separators.

11. The method of claim 10 wherein 25 to 50 parts of Vinsol resin are added before compounding.

12. The method of claim 10 wherein from 0 to 25 parts of a material from the group consisting of (A) natural rubber, (B) reclaimed rubber, (C) polybutadiene, (D) SBR rubber, and mixtures thereof are added before compounding, along with from 10 to 25 parts of sulfur.

13. The method of claim 12 wherein 25 to 50 parts of Vinsol resin are added before compounding.

14. The method in claim 10 wherein said curing step is carried out at 325° F.

References Cited in the file of this patent

UNITED STATES PATENTS

| | | |
|---|---|---|
| 2,653,986 | Philipps | Sept. 29, 1953 |
| 2,678,961 | Uhlig et al. | May 18, 1954 |
| 2,810,775 | Raphael et al. | Oct. 22, 1957 |

OTHER REFERENCES

Butyl (vol. I), published by Enjay Co., Inc., N.Y.C. Copyright 1956. Chapter—Electrical Applications, 20 pages.

"Polymer Processes" (Schildknecht), published by Interscience Publisher Inc., N.Y., 1956, pages 599 and 673 relied on.